United States Patent [19]

Dutt

[11] Patent Number: 5,238,537

[45] Date of Patent: * Aug. 24, 1993

[54] EXTENDED NIP PRESS BELT HAVING AN INTERWOVEN BASE FABRIC AND AN IMPERVIOUS IMPREGNANT

[76] Inventor: William H. Dutt, Van Winkle Dr., R.D. #1, Rensselaer, N.Y. 12144

[*] Notice: The portion of the term of this patent subsequent to Aug. 10, 2010 has been disclaimed.

[21] Appl. No.: 800,690

[22] Filed: Dec. 2, 1991

Related U.S. Application Data

[63] Continuation of Ser. No. 441,237, Nov. 22, 1989, abandoned, which is a continuation of Ser. No. 14,625, Feb. 13, 1987, abandoned, which is a continuation-in-part of Ser. No. 735,471, May 17, 1985, abandoned, which is a continuation of Ser. No. 302,345, Sep. 15, 1981, abandoned.

[51] Int. Cl.⁵ .............................................. D21F 3/02
[52] U.S. Cl. ................................ 162/358.4; 162/901; 198/846; 198/847; 428/225; 428/245; 428/287
[58] Field of Search .................. 474/268; 139/383 A; 162/348, 358, DIG. 1; 198/846, 847; 428/225, 245, 287

[56] References Cited

U.S. PATENT DOCUMENTS

| | | |
|---|---|---|
| 1,536,533 | 5/1925 | Sheehan . |
| 2,659,958 | 11/1953 | Johnson . |
| 2,718,791 | 9/1955 | Hose . |
| 3,278,667 | 10/1966 | Knox . |
| 3,613,258 | 10/1971 | Jamieson . |
| 3,808,092 | 4/1974 | Busker . |
| 3,974,026 | 8/1976 | Emson . |
| 3,994,765 | 11/1976 | Brinkmann . |
| 4,109,543 | 8/1978 | Foti . |
| 4,224,372 | 9/1980 | Romanski ............... 428/257 |
| 4,229,253 | 10/1980 | Cronin .................. 162/358 |
| 4,229,254 | 10/1980 | Gill . |
| 4,238,237 | 12/1980 | Gill . |
| 4,330,023 | 5/1982 | Cronin . |
| 4,552,620 | 11/1985 | Adams ................... 162/358 |
| 4,643,916 | 2/1987 | Kiuchi ................... 427/126 |

FOREIGN PATENT DOCUMENTS

| | | |
|---|---|---|
| 1048323 | 2/1977 | Canada . |
| 0013890 | 1/1980 | European Pat. Off. . |
| 0027716 | 4/1981 | European Pat. Off. . |
| 1506409 | 2/1970 | Fed. Rep. of Germany . |
| 1625850 | 2/1970 | Fed. Rep. of Germany . |
| 2108423 | 9/1972 | Fed. Rep. of Germany . |
| 2829226 | 1/1979 | Fed. Rep. of Germany . |
| 2939637 | 4/1981 | Fed. Rep. of Germany . |
| 1210269 | 3/1960 | France . |
| 2164931 | 12/1972 | France . |
| 2219836 | 2/1974 | France . |
| 2455119 | 4/1980 | France . |
| 57-56598 | 11/1982 | Japan . |
| 1061 | 12/1967 | New Zealand . |
| 1071 | 10/1968 | New Zealand . |
| 893637 | 4/1962 | United Kingdom . |
| 1088066 | 2/1967 | United Kingdom . |
| 2000520A | 6/1977 | United Kingdom . |
| 1599347 | 7/1977 | United Kingdom . |
| 2029471 | 9/1978 | United Kingdom . |
| 2048753 | 4/1979 | United Kingdom . |
| 2049754 | 4/1979 | United Kingdom . |
| 2050456 | 4/1979 | United Kingdom . |
| 2057027 | 8/1979 | United Kingdom . |
| 2062041 | 11/1979 | United Kingdom . |
| 2068431 | 1/1980 | United Kingdom . |
| 2106555 | 4/1983 | United Kingdom ............. 162/358.4 |
| 2106557 | 4/1983 | United Kingdom ............. 162/358.4 |
| 2141245A | 6/1983 | United Kingdom . |
| 2186573 | 2/1986 | United Kingdom . |

OTHER PUBLICATIONS

Plastic Material Lecture (2), Polyurethane Resin, Tenth edition, pp. 152–158, issued from Nikkan Kogyo Shinbun-sha, on Feb. 10, 1978.

Kirk-Othmer Encyclopedia of Chemical Technology Second completely revised edition.

Modern Plastics Encyclopedia Issue for 1961 Sep. 1960 vol. 38, No. 1A.

*Primary Examiner*—Steve Alvo
*Attorney, Agent, or Firm*—Kane, Dalsimer, Sullivan, Kurucz, Levy, Eisele and Richard

[57] ABSTRACT

An endless impervious, oil, abrasion, and crush resistant belt for use with papermaking machinery such as presses, especially of the extended nip type for the mechanical removal of water from a web of paper including a urethane coating impregnating woven base providing a structure which is impregnated and impervious to oil, water, and air. The impregnated surface of the belt is made smooth and uniform in thickness through a grinding and polishing operation to act as a hydraulic bearing surface.

9 Claims, 1 Drawing Sheet

EXTENDED NIP PRESS BELT HAVING AN INTERWOVEN BASE FABRIC AND AN IMPERVIOUS IMPREGNANT

RELATED APPLICATIONS

This is a continuation of copending application Ser. No. 441,237 filed on Nov. 22, 1989 now abandoned, which is continuation of co-pending application Ser. No. 014,625 filed on Feb. 13, 1987, now abandoned; Which application is a continuation-in-part of application Ser. No. 735,471 filed May 17, 1985, now abandoned; which was a continuation of application Ser. No. 302,345 filed Sept. 15, 1981, now abandoned.

BACKGROUND OF THE INVENTION

The field of the invention relates to a belt used for extracting water from a web of material, and more particularly from a fibrous web formed in a papermaking machine.

During the papermaking process, a web is formed by depositing a fibrous slurry on a forming wire. A large amount of water is drained from the slurry during this process, after which the newly-formed web proceeds to a press section. The press section includes a series of press nips. The web finally proceeds to a drying section including heated dryer drums where the water content is reduced to a desirable level.

In view of the high cost of energy, it is desirable to remove as much water as possible from the web prior to its entering the drying section. The dryer drums in this section are often heated by steam and costs can be substantial if a large amount of water needs to be removed.

The use of the extended nip press has been found to be advantageous over the use of nips formed by pairs of adjacent rollers. By extending the time the web is subjected to pressure in the nip, a greater amount of water can be removed. This fact has been recognized by those skilled in the art, and several patents have been granted in the area. These patents include Re. 30,268, 4,201,624, 4,229,253 and 4,229,254.

In using the extended nip press to dewater a fibrous web, the web has typically been sandwiched between two moisture-absorbing felts and a belt. The felts are trained around a cylindrical press roll with the web between them while the belt is arranged for applying pressure to the felts and roll. A pressure shoe exerts pressure on the belt in the press area and the shoe and belt are lubricated with a hydraulic oil.

A problem has been encountered during the dewatering of webs in extended nips. It has been found that a bulge develops in the belt ahead of the nip which in turn results in delamination. This problem is recognized in the U.S. Pat. Nos. 4,229,253 and 4,229,254 and certain belt constructions are suggested for overcoming the problem.

SUMMARY OF THE INVENTION

The invention is directed to a belt for dewatering a fibrous web used on an extended nip press provided by a roll and the belt which is forced toward the roll by a pressure shoe for applying pressure to the fibrous web and web transporting papermakers felt in the nip. The belt comprises a base fabric which is impregnated with a thermoplastic or thermosetting polymeric material. The base fabric which can be single layer or multilayer, is sufficiently open to allow total impregnation of the material to eliminate any voids in the final fabric. A significant advantage of this belt construction is that it can be made in any length since it does not require a mandrel during the manufacture thereof. A base fabric is provided endless using conventional fabric technology and then coated and impregnated with the polymeric material.

The resulting structure is both light in weight and sufficiently stable to operate under paper machine conditions. It has sufficient abrasion resistance to resist any wear that might take place in the extended nip apparatus. Unlike materials which are built up in the manner of a rubber tire and can bulge and delaminate, the invention provides a belt which will maintain its integrity. The belt has a uniform smooth polymeric surface which is engaged by a pressure shoe applying pressure in the direction of the roll.

In summary, the invention provides a belt having a surface which is impervious to oil and which is an improvement in operation over the belts which were built-up by vulcanization and which have a tendency to bulge and delaminate.

DETAILED DESCRIPTION OF THE INVENTION

Figure 1:
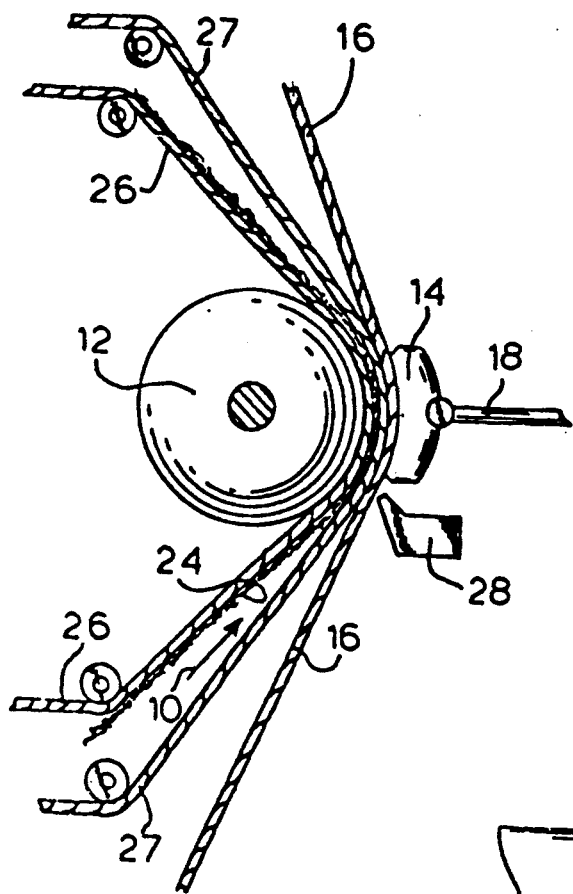
FIG. 1 is a side elevational view of an extended nip press utilizing the belt of the present invention.
Figure 2:
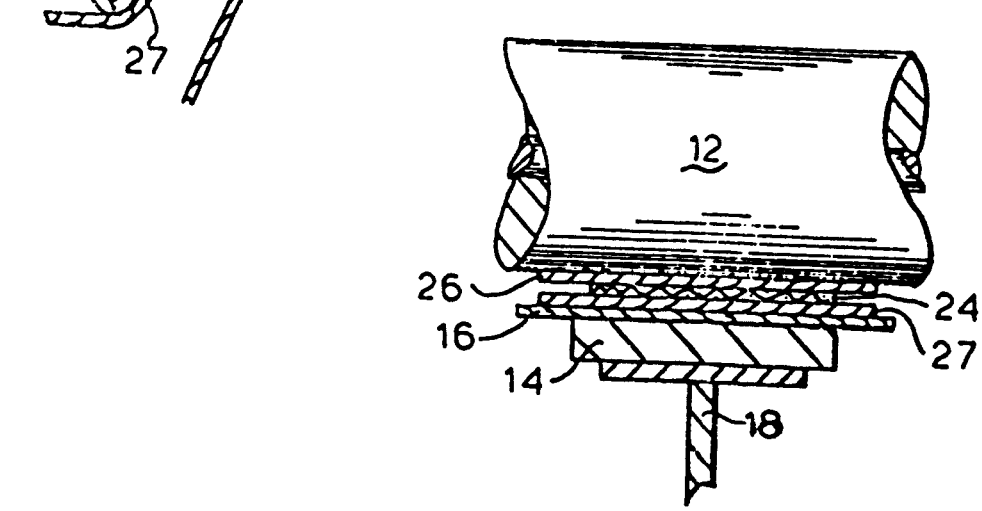
FIG. 2 is a partially sectional front view of the press nip shown in FIG. 1.

An extended nip press for dewatering a travelling web of material is shown in FIG. 1. The nip 10 is defined by a cylindrical press roll 12, a pressure shoe 14 having an arcuate surface facing the press roll, and the belt 16 of the invention arranged such that it bears against the surface of the press roll. The arcuate surface of the pressure shoe has about the same radius of curvature as the press roll. The distance between the press roll and the pressure shoe may be adjusted by means of conventional hydraulic or mechanical apparatus (not shown) connected to a rod 18 pivotally secured to the shoe 14. The rod may also be actuated to apply the desired pressure to the shoe. It will be appreciated that the pressure shoe and press roll described above and shown in FIGS. 1-2 are conventional and that other arrangements may be utilized in accordance with the invention.

Figure 3:
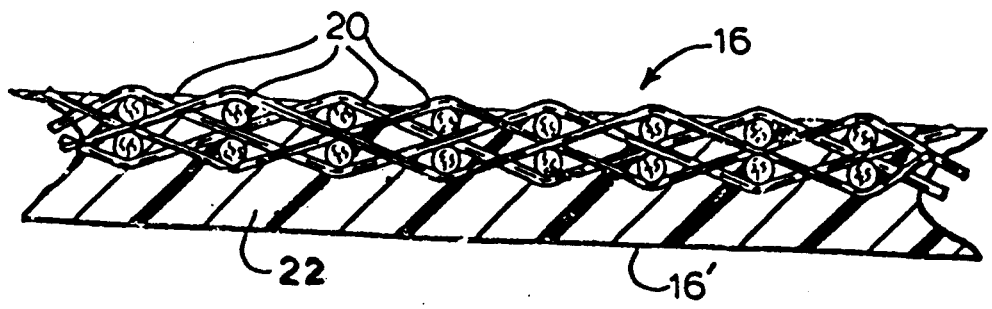
FIG. 3 is a sectional side elevational view of the belt of the invention.

An embodiment of a belt 16 constructed in accordance with the invention is shown in detail in FIG. 3. It has proven to be superior to belts currently known to the art both from an operational standpoint and for manufacturing considerations. The belt 16 comprises a base fabric 20 which is impregnated with a polymeric material 22. Thermosetting resins such as polyurethanes have been found to be suitable impregnating materials. Thermoplastic polymers such as polypropylene are also acceptable.

The base fabric 20 is sufficiently open to allow total impregnation. This eliminates the possibility of any voids forming in the final fabric which would allow the lubrication used between the belt and shoe to pass through the belt and contaminate the felt and fibrous web. It is endless in final construction and uniform in thickness. The fabric must also be made to have sufficient stability under paper machine conditions. In other words, it must have length stability, width stability, and guidability.

The thermoplastic resin or thermosetting resin used, should be a substantially one hundred percent solid composition to avoid the formation of bubbles during the curing process of the resin in the belt structure.

The belt has at least one smooth side 16' which contacts the pressure shoe 14.

Belts manufactured in accordance with the invention have been found to have many desirable characteristics. They move easily over the pressure shoe and are capable of transmitting pressure from the shoe to the web and press roll. Sufficient flexibility is obtained, and the belts have proven to be unaffected by lubricant applied prior to entering the press nip.

In comparison with belts currently known to the art, the invention provides a belt which is relatively thin and light in weight. Thick belts have the disadvantage of tending to flow while within the nip causing bulging and delamination. For example a 24'6"×170" belt impregnated with a thermosetting resin in accordance with the invention weighs about two hundred pounds. A similar size belt built-up under previous technology which fails due to bulging and delamination would weigh about twelve hundred pounds.

The manufacture of the belt according to the invention may be accomplished economically and without the need for mandrels or autoclaves which limit the size of other belts. A belt of any length can accordingly be produced. The base structure is first woven. A web may be needled into the woven base if desired. If the base structure has not been woven endless it is then joined endless using conventional joining techniques applicable to forming fabrics in the paper industry. A polymeric material is then applied to the base fabric and forms a mechanical interlock therewith. The resin is allowed to cure for a sufficient period of time. After curing, the resin surface may be sanded or ground (buffed) to provide a belt of uniform caliper having at lease one smooth surface.

A belt made in accordance with this invention may be utilized with the apparatus shown in FIG. 1. The belt 16 is positioned between the pressure shoe and the pressure roller. The smooth coated side 16' of the belt is engaged by the shoe. A fibrous web 24 carried between first and second felts 26 and 27 respectively is introduced into the press nip 10. The side of the belt 16 engaging the shoe 14 is lubricated by lubricating means 28 positioned ahead of the nip.

The belt 16 is easily repaired should a hole or other surface irregularity develop therein. The damaged portion can be cleaned with a solvent and suitable amount of coating applied to the affected area. A heat gun can then be employed to cure the surface which can then be sanded.

Because of the excellent flexibility characteristics of the base structure and the fact that the coating can be kept to a minimum, the surface of the belt will have less tendency to fail due to bending fatigue. This is due to the fact that, because of the low caliper, the surface plane of the coated surface is at a minimum distance from the neutral axis of bending. This reduces the percentage of elongation and compression at the surface plane during bending.

EXAMPLE 1

A two-layered monofilament base fabric was flat woven, heat stabilized, and joined endless using normal joining techniques. The fabric was then coated with a 100% solid polyurethane resin Dupont Adiprene L 100 and cured. The coating step may be accomplished through the use of a doctor blade or the like to obtain a smooth surface. If the outside surface of the base fabric is coated, it may be turned inside out for use in the application.

EXAMPLE 2

A monofilament fabric is woven into a two layer weave having sufficient openness. It is heatset and joined endless. The endless fabric is placed on a finishing machine including a pair of rollers. One of the rollers is an oil heated cylinder. A polyurethane sheet of proper uniform caliper is placed on the inside surface of the fabric and allowed to pass between the heated cylinder and the fabric structure. The temperature of the oil cylinder is maintained at a substantially constant level to obtain uniform melting and fusing of the plastic film. The sheet is trimmed so that there is no overlap in the material to be pressed into the fabric structure. As the fabric and sheet pass around the heated cylinder, sufficient heat is maintained to cause the polyurethane to flow into the fabric. A pressure roll may be used against the outside of the fabric to insure complete impregnation. The polyurethane is plasticized and forced into the voids of the fabric. A smooth surface is obtained which does not require any further finishing steps. The use of a 100% polymeric sheet also eliminates any problems which could develop in the finished fabric resulting from the use of an impregnation compound containing solvents or water. After the fabric has undergone the pressing operation, the edges are trimmed and sealed for operation in a papermaking machine.

EXAMPLE 3

A monofilament polyester base fabric having sufficient openness for impregnation is provided. The fabric is a two layer weave having both width and length stability. A polypropylene film having a thickness of about 0.020 inches or more is fused to the base fabric in the manner described in Example 2. The temperature of the oil cylinder is maintained at a substantially constant level to obtain uniform melting and fusing of the plastic film. The base fabric has a higher melting temperature than the polypropylene film and is not disturbed by the heating process. After the fabric has undergone the pressing operation, the edges are trimmed and sealed for operation in a papermaking machine.

It will be appreciated that the belt utilized in the invention may include a base fabric made from various polymeric materials having the necessary properties for application in papermaking machines. Materials other than polyurethane and polypropylene may also be employed as the coating material. Also the weave of the belt may be altered. Known coating and impregnating techniques may be employed in the practice of the invention.

What is claimed is:

1. An extended nip press belt for use in dewatering a fibrous web transported by a papermaker's felt means in an extended nip press of the type having a cylindrical press roll and a pressure shoe for applying pressure to the felt means and fibrous web wherein a lubricant is used between the belt and the pressure shoe, said belt having an inner surface and an outer surface and comprising:

an interwoven base fabric, said interwoven base fabric being in the form of an endless loop, said endless loop having an inner side and an outer side, said inner side of said base fabric having an impregnant formed thereon and penetrating thereinto, said impregnant being buffed to provide a smooth impervious machine ground surface on said inner side of said base fabric, said impregnant thereby being on the inner surface of said extended nip press belt and slidingly engaging said pressure shoe, and being impervious to the lubricant used between the belt and the pressure shoe, said base fabric and said impregnant comprising said belt which is uniform in thickness as a consequence of said impregnant being buffed, whereby, upon passage of said papermaker's felt means, in the nip of said press, between said press roll and said belt, said pressure shoe engaging said inner surface of said belt and applying pressure to said felt means and said fibrous web therethrough, liquid is transferred from the fibrous web to the felt means engaged thereby through the medium of said belt.

2. A belt for use in dewatering a fibrous web in an extended nip press in accordance with claim 1 wherein said impregnant is substantially 100% solid composition as impregnated into the belt.

3. A belt for use in dewatering a fibrous web in an extended nip press in accordance with claim 1 wherein said base fabric is a two layer monofilament fabric.

4. A belt for use in dewatering a fibrous web in an extended nip press in accordance with claim 1 wherein said impregnant is substantially 100% solid polyurethane resin as impregnated into the belt.

5. A belt for use in dewatering a fibrous web in an extended nip press in accordance with claim 1 wherein said base fabric is woven.

6. A belt for use in dewatering a fibrous web in an extended nip press in accordance with claim 1 wherein said base fabric is polyester.

7. A belt for use in dewatering a fibrous web in an extended nip press in accordance with claim 2 wherein said base fabric is a two layer monofilament fabric.

8. A belt for use in dewatering a fibrous web in an extended nip press in accordance with claim 2 wherein said base fabric is woven.

9. A belt for use in dewatering a fibrous web in an extended nip press in accordance with claim 2 wherein said base fabric is polyester.

* * * * *